March 14, 1950     H. HUNT     2,500,460
SLIDE RULE
Filed July 11, 1949
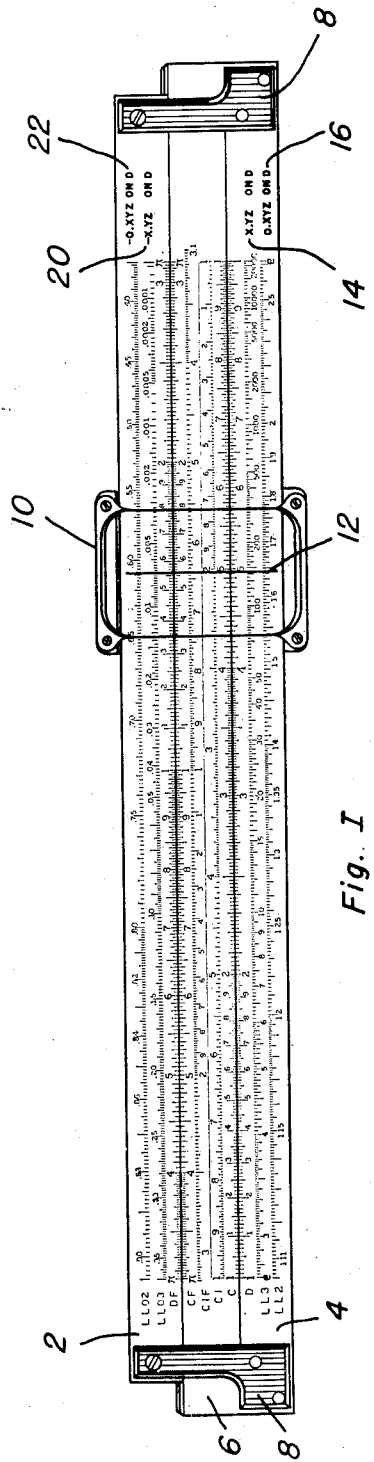
Fig. I
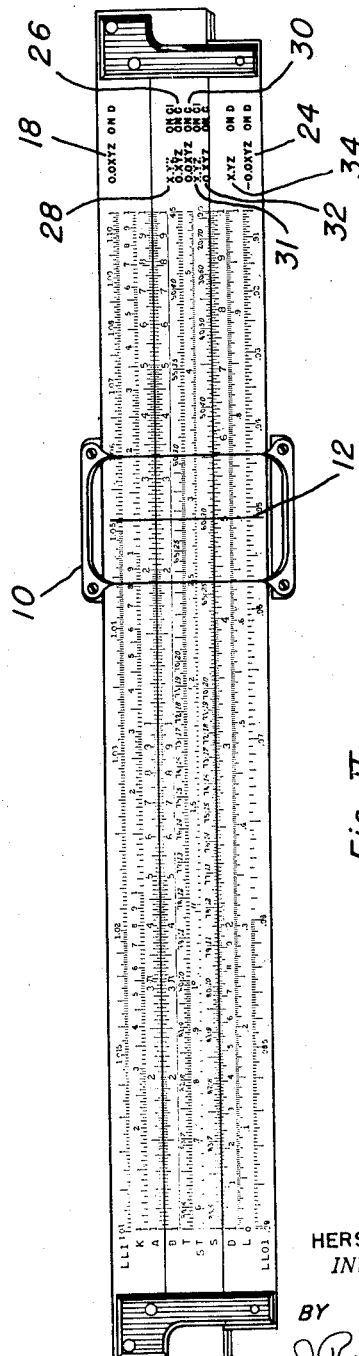
Fig. II
HERSCHEL HUNT
*INVENTOR.*
BY
*ATTORNEY*

Patented Mar. 14, 1950

2,500,460

UNITED STATES PATENT OFFICE 2,500,460

SLIDE RULE

Herschel Hunt, La Fayette, Ind., assignor to Keuffel & Esser Company, Hoboken, N. J., a corporation of New Jersey Application July 11, 1949, Serial No. 104,035

8 Claims. (Cl. 235—70)

This invention relates to improvements in the logarithmic slide rule.

A principal object is to provide in a slide rule means to facilitate the rapid, and error-free placing of the decimal point in first, intermediate, and final factors and answers in making mathematical computations.

Another object is to facilitate the determination of the proper scale for use in certain types of problems.

Still another object is to provide means for the rapid and error-free determination of the correct sign—plus or minus—in the solution of problems.

A further object is to provide in a slide rule having two relatively movable members with graduations and indicia thereon to form a basic scale and graduations and indicia thereon to form a discrete scale in combination, a legend adjacent said discrete scale, said legend comprising a series of characters and a decimal point which is positioned with respect to said series of characters the same as that of the absolute value of the numerical value indicated on the basic scale opposite any numerical value indicated on the discrete scale.

These and other objects may be attained through the practice of this invention which is more particularly set forth in the description herein and in the accompanying drawing in which—

Figure 1 is a view in plan showing the obverse side or front face of a slide rule.

Figure 2 is a view in plan showing the reverse side or back face of a slide rule of the embodiment of Figure 1.

In the linear slide rules now commonly used are found many types of scales, each having a useful function in the solution of certain kinds of problems. Among such scales with their customary designation are the following:

Group I.—*Single cycle logarithmic scales representing numbers*

C on the slide graduated left to right from 1 to 10
D on the body graduated left to right from 1 to 10
CI on the slide graduated left to right from 10 to 1
DI on the body graduated left to right from 10 to 1
CF on the slide graduated left to right from $\pi$ to $10\pi$
DF on the body graduated left to right from $\pi$ to $10\pi$
CIF on the slide graduated left to right from $10\pi$ to $\pi$
DIF on the body graduated left to right from $10\pi$ to $\pi$ Group II.—*Multiple cycle logarithmic scales representing numbers*

A on the body graduated left to right from 1 to 100
B on the slide graduated left to right from 1 to 100
AI on the body graduated left to right from 100 to 1
BI on the slide graduated left to right from 100 to 1
K on the body graduated left to right from 1 to 1000
KI on the body graduated left to right from 1000 to 1

Group III.—*Single cycle or double cycle logarithmic scales representing angles*

S angles whose sines range left to right from 0.1 to 1.0
ST angles whose sines range left to right from 0.01 to 0.1
T angles whose tangents range left to right from 0.1 to 1.0
SI angles whose sines range left to right from 1.0 to 0.1
STI angles whose sines range left to right from 0.1 to 0.01
TI angles whose tangents range left to right from 1.0 to 0.1

Group IV.—*A scale of decimal exponents of 10*

L, a full-length, equal-parts scale graduated left to right from 0 to 1

Group V.—*Logarithmic scales of logarithms or of powers. These may be to any base depending upon the value opposite the index of the C or D scale, such as 10 or the base of natural logarithms, i. e. $e(=2.718+)$. Where the base $e$ is opposite the index of the D scale, the following is the arrangement:*

LL1 powers of $e$ in the range left to right from 0.01 to 0.1
LL2 powers of $e$ in the range left to right from 0.1 to 1.0
LL3 powers of $e$ in the range left to right from 1.0 to 10.0
LL01 powers of $e$ in the range left to right from −0.01 to −0.1
LL02 power of $e$ in the range left to right from −0.1 to −1.0
LL03 powers of $e$ in the range left to right from −1.0 to −10.0

*Group VI.—Logarithmic scales of hyperbolic functions*

Sh1 hyperbolic sines in the range left to right from 0.1 to 1.0
Sh2 hyperbolic sines in the range left to right from 1.0 to 10.0
Th hyperbolic tangents in the range left to right from 0.1 to 1.0

The scales in Group I will be called "basic" scales, not only because they have a single logarithmic cycle in the length of the rule, but particularly because their indicia permit the reading on them of any real number whatever, as will be understood, by the proper placing of the decimal point; that is, by multiplying the number by an integral power of 10, to bring it between 1 and 10.

The scales in Groups III to VI inclusive will be called "discrete" scales because their indicia have discrete values.

The scales in Group II are basic in the sense that their indicia may represent numbers of various powers of ten, but these powers are selective. They could be basic scales where any of the other scales are "referred" to or read against them. For example, if the trigonometric scales are referred to the A and B scales, these scales become basic scales.

Any single scale on the slide rule is ordinarily of no value by itself but becomes of value as it is used in reference to some other scale on the rule. Reference between two scales may be termed "static" when both scales are on the body or both on the slide, or when the rule is closed as in Figs. 1 and 2. Reference may be called "dynamic" when it is between a scale on the body and a scale on the slide.

Because of the construction of the slide rule as explained above, I have discovered that the static or fixed reference from any discrete scale to its scale of reference which in this case would be scales C or D represents a range of values on C or D whose limits may be encompassed precisely by a single power of 10. Not only do the indicia of discrete scales have discrete values themselves, but they also impart discrete values to the C or D scales in static reference. I have discovered a way to equip each discrete scale with a legend indicating such range of values, and by so doing have greatly enhanced the utility of the slide rule. Earlier suggestions to help place the decimal point have been very complicated or cumbersome or did not assist in indicating the scale of reference.

My invention, therefore, teaches placing one or more symbols or legends adjacent a discrete scale to indicate the range of values associated with that scale in static reference to C or D or to some other basic scale which is also correlated by the legend.

Referring to Figs. 1 and 2 one embodiment of the invention is illustrated on the slide rule shown therein. The slide rule itself consists of the usual fixed or body members 2 and 4 provided with a slide or relatively movable number 6. The fixed members are held in position by end plates 8. The usual indicator 10 with a hairline 12 is slidable along the slide rule.

The scale arrangement in Figs. 1 and 2 is generally similar in composition and position to those shown in Bland Patent 2,422,649, issued June 17, 1947. At the right end of the various scales are the special lengends referred to above. Specifically, at the end of the LL3 scale is the legend $x.yz$ on D designated by the reference numeral 14. At the end of the LL2 scale is the legend $0.xyz$ on D designated by the reference numeral 16, and, referring to Fig. 2, opposite the scale LL1 the legend $0.0xyz$ on D designated by the reference numeral 18. Similarly, opposite the scales LL03, LL02 and LL01 are the legends $-x.yz$ on D, $-0.xyz$ on D and $-0.0xyz$ on D, respectively, which legends are designated by the reference numerals 20, 22 and 24, respectively. These legends are opposite scales which are normally numbered in red but are referred to black scale D or when the rule is closed also to C. Instead of including the words "on D" the legends which refer to the basic D (and C) scales may have the same color as the basic scale to which it refers. In these cases they would be black.

The scale marked T when read from left to right and right to left is graduated for angles from 6° to 45° and from 45° to 84°. The numerals from 6° to 45° which refer to C (or D) are usually in black. The numerals from 45° to 84° (except 45° per se) which refer to CI (or DI) are usually in red or otherwise distinguished from the first set of numerals. The tangents for values from 6° to 45° are read opposite the angles on the C or D scales which are black. The values of the tangents of angles from 45° to 84° are read opposite the values on the scale CI (or DI) which are usually numbered in red.

Accordingly, the legend $0.xyz$ on C (26) may be in black to correlate with the C or D scales and the legend $x.yz$ on CI (28) should be in red to correlate with the CI scale.

If an angular value in black on the T scale is used to read a co-tangent, it will be read on the CI scale which is numbered in red. The legend $x.yz$ on CI (28) which is in red gives the position for the decimal point of such co-tangent when determined on its basic or reference scale which is in red. If an angular value in red on the T scale is used to read a co-tangent, it will be read on the C or D scales which are numbered in black. The legend $0.xyz$ on C (26) which is in black gives the position for the decimal point of such co-tangent when determined on its basic or reference scale which is in blank.

At the end of the scale ST is the legend $0.0xyz$ on C, designated by the reference numeral 30. The values of sines (or tangents) from about .6° to about 5.7° are read on the C or D scales (black) and, accordingly, the legend $0.0xyz$ (30) is preferably black.

At the end of the scale marked S are the legends $x.yz$ on CI (31), preferably in red, $0.xyz$ on C, designated by the reference numeral 32, preferably in black. Since sines from 6° to 90° which are numbered in black on the S scale are read on the C or D scales (also in black), the legend $0.xyz$ (32) in black gives the position for the decimal point of such sines. The co-secants of angles from 6 to 90°, numbered in black on the S scale, are read on the CI (or DI) scales which are numbered in red. The position of the decimal point in the numerical values of such co-secants is indicated by the legend $x.yz$ (31) in red at the end of the S scale.

The S scale may be numbered from right to left from 0 to 84° in red. The numerical value on the D scale in black opposite any angular value in red on the S scale gives the cosine. Since the cosine is read on a black scale, the legend $0.xyz$ (32) is used to assist in placing the decimal point. The same red numbers on S give the angular values for secants the numerical values of which are read on a red scale, CI or DI, and accordingly the legend *x.yz* (31) in red is used to assist in placing the decimal point.

The L scale has a legend *x.yz* on D at its end and is designated by the reference numeral 34. Since its basic scale is the D or C scale, the legend is in black.

In the foregoing discussion reference has been made to color. It will be understood that other means may be used for correlating the legends and the numerals or other indicia on the scales. For example, numbers and legends which are indicated as being black above may be forward slanted and legends and numerals indicated as being red may be back slanted. Other similar devices may be used as will be understood. Such characteristics with or without the direct statement of the scale of reference provide the correlation.

In another embodiment of the invention numerals are used for the legends. These numerals show the range of the absolute value of the numerical value indicated on the basic scale opposite any value on the discrete scale.

In describing this embodiment of the invention reference will be made to the same basic arrangement of slide rule scales as is illustrated as in the embodiment of Figs. 1 and 2. Opposite the scales LL3, LL2 and LL1 would be the legends 1.0 to 10.0, 0.1 to 1.0 and 0.01 to 0.1, respectively. Similarly, scales LL03, LL02 and LL01 would have the symbols −1.0 to −10.0, −0.1 to −1.0 and −0.01 to −0.1, respectively.

Opposite the T scale and with characteristics similar to those of the numbers 6 to 45 would be the legend 0.1 to 1.0, and with the characteristics of the numbers 50 to 84 the legend 10.0 to 1.0. The legend 0.01 to 0.1 may be placed at the end of scale ST and opposite the sine scale, S, the legend 0.1 to 1.0. The legend 1.0 to 10.0 at the end of the L scale gives the absolute value when referred to scale D (or C).

The specific arrangement of scales and the legends applied in connection with these scales are given for purposes of illustration. It will be understood that the same principles may be applied to many other scales and other scale arrangements in addition to those illustrated.

The principle of applying the invention will be explained in detail for the T scale as an example of the method followed in applying it to all discrete scales.

In these symbols, "0" represents zero, "." represents a decimal point, "*x*" represents any integer from 1 to 9, inclusive, and "*y*" and "*z*" each represent any integer 0 to 9, inclusive. Thus the symbol 0.*xyz* represents a number which must be no less than 0.100 and no greater than 0.999+, that is, any number from 0.1 to 1.0. In the same manner 0.0*xyz* represents any number from 0.0100 to 0.1 and *x.yz* represents any number from 1 to 10. The plus sign (+) in 0.999+, while not inherent, may be readily inferred since the selection of letters *x*, *y* and *z* is limited to three for convenience only, as any number of additional letters could be added each representing integers up to 9 to bring this number infinitely close to 1.0, but such a procedure is unnecessary on account of the limits of accuracy of the slide rule which are not greater than 999 to 1 on the usual ten-inch rule.

The letter T at the left of the so-called tangent scale is understood to mean in part "opposite an angle on this scale may be read its tangent in static reference to the basic scales (C or D)."

Likewise the legend "0.*xyz* on C" at the right of this scale is understood to mean "the tangent so read on the basic scales (C or D) has a range of values lying between 0.100 and 1.0."

Since 0.1=tan 5°44′ and 1.0=tan 45°, the symbol 0.*xyz* applies only to angles from 5°44′ to 45°. The T scale may be used for angles greater than 45° by making use of the trigonometric identity $$\tan \phi = \frac{1}{\tan (90° - \phi)} \qquad (1)$$

It is customary to equip the T scale with two sets of angle indicia which permits the use of this scale to find tangents of angles from 45° to 84°16′ but on account of the reciprocal relation (1) reference is to the reciprocal scales CI or DI instead of to C or D. Consequently the second symbol *x.yz* on CI means in effect "when this scale is used for angles greater than 45° and static reference is made to CI or DI, the range of values so read lies between 1.0 and 10.0." In order to avoid confusion, it is customary to show this second set of indicia either in different colors or by slanting the indicia or both. The symbol *x.yz* may be similarly treated and correlated to the basic scale for the sake of clarity.

In like manner the symbol 0.*xyz* on C opposite the S scale means "in static reference from angles on this scale sines as read on C or D have a range from 0.1 to 1.0."

The symbol 0.0*xyz* on C at the end of ST means "in static reference from angles on this scale sines or tangents as read on C (or D) have a range from 0.01 to 0.1."

The symbol *x.yz* on scale L means "in static reference from a power of 10 on this scale its value as read on scales C or D has a range from 1.0 to 10."

The symbol 0.0*xyz* on scale LL1 means "in statis reference from a power of *e* on this scale its value on scales C or D has a range from 0.01 to 0.1."

The symbols 0.*xyz* on scale LL2, *x.yz* on LL3, −0.0*xyz* on scale LL01, −0.*xyz* on LL02 and −*x.yz* on LL03 have corresponding meanings as will be understood. Similar legends or symbols can be provided for any discrete scale whatever.

Another embodiment of this invention is to use instead of the "*xyz*" notation described above a series of legends in which the range limits are actually stated numerically. Instead of 0.0*xyz*, the legend "0.01 to 0.1"; instead of 0.*xyz* "0.1 to 1.0"; instead of *x.yz* "1.0 to 10.0": instead of −*x.yz* "−1.0 to −10.0"; etc.

The practical use and value of these legends in static reference will be seen from the following examples:

Find the angle whose sine is 0.065. The answer will appear opposite 65 of scale C (or D when the rule is closed) on either the S or ST scale, both of which are scales of sines. By consulting the legends of S (0.1 to 1.0 or .*xyz*) and ST (1.01 to 0.1), we note that the answer will fall on ST because 0.065 lies in the range of .0*xyz* or 0.01 to 0.1. Hence we read opposite 65 on D, 3.725° on ST. Without the aid of the legend we might have read in error 40.5° on S.

Find the angle whose tangent is 0.577. The angle sought will appear on one of the tangent scales T or ST. The symbols found opposite these scales are 0.*xyz* and *x.yz* opposite T and 0.0*xyz* opposite ST. Since the number 0.577 is in the range 0.*xyz*, the black symbol on T, we must read from a black scale such as C or D to scale T. Since we are using a direct function, we read on the same colored numbers of scale T which in this case is black. Therefore, opposite 577 on C we read on T, 30°=tan⁻¹ 0.577. Or suppose the problem is to find tan⁻¹ 0.0577. The number 0.0577 is in the range 0.0$xyz$ which is seen to be the black symbol of the ST scale. This shows that scale C and the ST scale must be used in this problem. Therefore, opposite 577 on scale C, we read on scale ST, 3.31°=tan⁻¹ 0.0577. Furthermore if it is required to find tan⁻¹ 5.77 we find the appropriate symbol $x.yz$ opposite scale T, and note that this symbol is colored red (or given some other significant treatment such as slanting backward) which suggests that the red numbered basic scale, i. e.: CI, is to be used, rather than the black numbered basic scale C, according to the particular plan adopted, such as black-to-black and red-to-red, straight-to-black and slanting-to-red, or the like. Therefore, opposite 5.77 on scale CI, we read on scale T red 81.7°=tan⁻¹ 5.77. To determine the angle whose cotangent is .577 refer to the legends 26 or 28 opposite the T scale. It will be seen that this value is within the range of .1 to 1 (26) and the legend is in black. Therefore, the indicator hairline is set at .577 on the black C or D scale and under the hairline on the $t$ scale is the graduation 60—30. Since the cotangent is the function to be read, the red number 20 is the angle whose cotangent is .577.

If we wish to determine the angle whose cotangent is 5.77, we proceed in the same manner. 5.77 is between 1 and 10, legend 28, which is in red. The hairline is set at 577 on the CI (or DI) scales and under the hairline on the T scale is a graduation which is either between 9 and 10 (black) or between 80 and 81 (red). Since we are concerned with a co-function, the red to black relationship is used, i. e. red on the CI to black on the T, and the value is between 9 and 10 or 9.85°. The angle whose cotangent is 5.77 is 9.85°. These examples illustrate the principle by which the symbols or legends specify the correct scales to use over a wide range of values of angles and of their tangents and cotangents.

Find the tangent of 70°. We find 70° to be a red (or back-slanting) number on the T scale; therefore, the red or back-slanting legend "$x.yz$" or "10.0 to 1.0" is to be used. The inverted order of this numerical legend even in the absence of "on CI" also suggests correctly that the inverted scale CI is to be used. Hence we read from T to CI, tan 70°=2.75. The legend also specified 2.75 rather than 0.275 as the correct value.

Find antilog 0.25. This problem may be restated, find x in x=10$^{0.25}$. Since the L scale represents exponents of 10, opposite 0.25 on L (which is numbered 0, .1, .2, etc. to .9 and 1.0) read 178 on D. The legend of L is 1.0 to 10.0; therefore, the answer lies between these limits and must be 1.78.

Find $e^{0.75}$. Since the LL1, LL2 and LL3 scales represent powers of $e$, we consult their legends and find that 0.75 is in the range of the LL2 scale legend. Therefore, opposite 75 of D read 2.117 on LL2.

Find $e^{-1.32}$. Since scales LL01, LL02, and LL03 represent minus powers of $e$, we find −1.32 in the range of the LL03 legend and read opposite 132 on D, 0.267 on LL03.

Find log$_e$ 1.06. Opposite 1.06 on LL1 read 583 on D. Since the LL1 legend is 0.01 to 0.1 we place the decimal 0.0583, to fall within its range.

In some cases a folded scale may be a basic scale. In such case the legend opposite a discrete scale might read 0.4 to 4.0 or .004 to .04, etc. Where the basic scale is a multiple cycle scale such as A or B, the legend could be, for example, 0.01 to 1.0.

The above examples are only a few of the many that might be given to illustrate the great value of the legends in static reference. But their value is by no means limited to static reference. They are also useful in dynamic reference, as indicated by the example given below.

Find 2.5 sin 15°. To 25 on D set left index of S; opposite 15° on S read 0.647 on D. The decimal point is placed by noting from the legend that sin 15° lies rather less than half the distance 0.1 to 1.0, therefore the answer is about ⅓ of 2.5 or somewhat less than 1.0.

Many other examples could be given. The legends are also useful in cross reference. For example, find $e^{\tan 4°}$. It is obvious that tan 4° is found on scale ST and $e^{\tan 4°}$ on an LL scale, but which LL scale? We simply find the one which has the same legend as that of the ST scale, namely 0.01 to 1.0 and note that the LL1 scale has the same legend. We, therefore, close the rule and opposite 4° on ST, $e^{\tan 4°}$=1.072 on LL1.

Beyond all these specific uses of the legends, they are extremely valuable to the student in clarifying his basic conceptions of the nature and use of the slide rule as a mathematical instrument.

I claim:

1. In a slide rule having two relatively movable members with graduations and indicia thereon to form a basic scale and graduations and indicia thereon to form a discrete scale in combination, a legend adjacent said discrete scale, said legend comprising a series of characters and a decimal point which is positioned with respect to said series of characters the same as that of the absolute value of the numerical value indicated on the basic scale opposite any value on the discrete scale.

2. In a slide rule having two relatively movable members with graduations and indicia thereon to form a basic scale and graduations and indicia thereon to form a discrete scale in combination, a legend adjacent said discrete scale, said legend comprising characters giving a range of absolute values the same as the range of the absolute values within which the numerical value indicated on the basic scale opposite any value on the discrete scale falls.

3. In a slide rule having two relatively movable members with graduations and indicia thereon to form a basic scale and graduations and indicia thereon to form a discrete scale of logarithms of logarithms in combination, a legend adjacent said discrete scale of logarithms of logarithms, said legend comprising a series of characters and a decimal point which is positioned with respect to said series of characters the same as that of the absolute value of the logarithm indicated on the basic scale opposite any value on the discrete scale of logarithms of logarithms.

4. In a slide rule having two relatively movable members with graduations and indicia thereon to form a basic scale having characters with predetermined characteristics and graduations and indicia thereon to form a discrete scale in combination, a legend adjacent said discrete scale, said legend comprising a series of characters of the same predetermined characteristics and a decimal point which is positioned with respect to said series of characters the same as that of the absolute value of the numerical value indicated on the basic scale opposite any value on the discrete scale.

5. In a slide rule having two relatively movable members with graduations and indicia thereon to form a basic scale, graduations and indicia thereon to form a second basic scale, and graduations and indicia thereon to form a discrete scale in combination, a first legend and a second legend adjacent said discrete scale, each of said legends comprising a series of characters and a decimal point one of which is positioned with respect to said series of characters the same as that of the absolute value of the numerical value indicated on the first basic scale opposite any value indicated on the discrete scale, the other of which is positioned with respect to said series of characters the same as that of the absolute value of the numerical value indicated on the second basic scale opposite any value indicated on the discrete scale.

6. In a slide rule having two relatively movable members with graduations and indicia thereon to form a first basic scale, graduations and indicia thereon to form a second basic scale having characters with special characteristics and graduations and indicia thereon to form a discrete scale which can be used to give values on either the first or second basic scales, in combination, a first legend adjacent said discrete scale having characters with the same characteristics as said first basic scale, a second legend adjacent said discrete scale having characters with the special characteristics of said second basic scale, said first legend comprising a series of characters and a decimal point which is positioned with respect to said series of characters the same as that of the absolute value of the numerical value indicated on said first basic scale opposite any value on the discrete scale, said second legend comprising a series of characters having special characteristics and a decimal point which is positioned with respect to said series of characters having special characteristics the same as that of the absolute value of the numerical value indicated on said second basic scale opposite any value on the discrete scale.

7. In a slide rule having two relatively movable members with graduations and indicia thereon to form a first basic scale with values increasing from left to right, having indicia characters with predetermined characteristics, graduations and indicia thereon to form a second basic scale with values increasing from right to left, having indicia characters with special characteristics and graduations and indicia thereon to form a discrete scale of angles which can be used to give values of trigonometric functions on either the first or second basic scales, said discrete scale of angles having indicia characters of said predetermined characteristics and said special characteristics, in combination, a first legend adjacent said discrete scale having characters with the same predetermined characteristics as said first basic scale, a second legend adjacent said discrete scale having characters with the special characteristics of said second basic scale, said first legend comprising a series of characters and a decimal point which is positioned with respect to said series of characters the same as that of the absolute value of the numerical value of the trigonometric functions indicated on said first basic scale opposite any value on the discrete scale, and said second legend comprising a series of characters having special characteristics and a decimal point which is positioned with respect to said series of characters having special characteristics the same as that of the absolute value of the numerical value of the trigonometric function indicated on said second basic scale opposite any value on the discrete scale.

8. In a slide rule having two relatively movable members with graduations and indicia thereon to form a first basic scale, graduations and indicia thereon to form a second basic scale having characters with special characteristics and graduations and indicia thereon to form a discrete scale which can be used to give values on either the first or second basic scales, in combination, a first legend adjacent said discrete scale having characters with the same characteristics as said first basic scale, a second legend adjacent said discrete scale having characters with the special characteristics of said second basic scale, said first legend comprising numerical characters giving a range of absolute values the same as that of the absolute values of the numerical value indicated on said first basic scale opposite any value on the discrete scale, and said second legend comprising numerical characters having special characteristics giving a range of absolute values the same as that of the absolute values of the numerical value indicated on said second basic scale opposite any value on the discrete scale.

HERSCHEL HUNT.

No references cited.

Certificate of Correction

Patent No. 2,500,460　　　　　　　　　　　　　　　　　　　　　　March 14, 1950

HERSCHEL HUNT

It is hereby certified that errors appear in the printed specification of the above numbered patent requiring correction as follows:

Column 1, line 9, for the word "for" after "scale" read *to*; column 3, line 73, for "lengends" read *legends*; column 4, line 47, for "blank" read *black*; column 6, line 62, for "1.01" read *0.01*;

and that the said Letters Patent should be read with these corrections therein that the same may conform to the record of the case in the Patent Office.

Signed and sealed this 1st day of August, A. D. 1950.

[SEAL]

THOMAS F. MURPHY,
*Assistant Commissioner of Patents.*